US012717487B2

(12) United States Patent
Sun et al.

(10) Patent No.: US 12,717,487 B2
(45) Date of Patent: Aug. 25, 2026

(54) CONFIGURABLE COMPUTE-IN-MEMORY CIRCUIT AND METHOD

(71) Applicant: TAIWAN SEMICONDUCTOR MANUFACTURING COMPANY, LTD., Hsinchu (TW)

(72) Inventors: Xiaoyu Sun, Hsinchu (TW); Murat Kerem Akarvardar, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 780 days.

(21) Appl. No.: 18/311,124

(22) Filed: May 2, 2023

(65) Prior Publication Data

US 2024/0053899 A1 Feb. 15, 2024

Related U.S. Application Data

(60) Provisional application No. 63/370,961, filed on Aug. 10, 2022.

(51) Int. Cl.
*G06F 3/06* (2006.01)
*G06N 3/0464* (2023.01)

(52) U.S. Cl.
CPC .......... *G06F 3/0613* (2013.01); *G06F 3/0656* (2013.01); *G06F 3/0683* (2013.01); *G06N 3/0464* (2023.01)

(58) Field of Classification Search
CPC .... G06F 3/0613; G06F 3/0656; G06F 3/0683; G06F 3/0464

(Continued)

(56) References Cited

U.S. PATENT DOCUMENTS 6,877,071 B2 * 4/2005 Sherman .............. G11C 7/1084 711/149
11,355,167 B2 6/2022 Seok et al.
(Continued)

FOREIGN PATENT DOCUMENTS

TW 201921354 6/2019

OTHER PUBLICATIONS

Kwon, Hyoukjun et al., "MAERI: Enabling Flexible Dataflow Mapping over DNN Accelerators via Reconfigurable Interconnects", ASPLOS '18, Mar. 24-28, 2018, Williamsburg, VA, pp. 1-15.

*Primary Examiner* — Jared I Rutz
*Assistant Examiner* — Edward Waddy, Jr.
(74) *Attorney, Agent, or Firm* — Hauptman Ham, LLP

(57) ABSTRACT

A circuit includes a data buffer configured to sequentially output first and second pluralities of bits, a plurality of memory macros having a total number, and a distribution network coupled between the data buffer and the plurality of memory macros. The distribution network separates the first plurality of bits into the total number of first subsets, and outputs each first subset to a corresponding memory macro, and either outputs an entirety of the second plurality of bits to each memory macro, or separates the second plurality of bits into a number of second subsets less than or equal to the total number, and outputs each second subset to one or more corresponding memory macros. Each memory macro outputs a product of the corresponding first subset and the one of the entirety of the second plurality of bits or the corresponding second subset of the second plurality of bits.

20 Claims, 7 Drawing Sheets

(58) Field of Classification Search
USPC .......................... 711/101, 100, 154, E12.001
See application file for complete search history.

(56) References Cited

U.S. PATENT DOCUMENTS

| | | | | |
|---|---|---|---|---|
| 11,853,594 | B2 * | 12/2023 | Hua | G06F 3/0679 |
| 2003/0055853 | A1 * | 3/2003 | Fowler | G06F 7/544<br>708/290 |
| 2006/0083101 | A1 | 4/2006 | Dhong et al. | |
| 2006/0161744 | A1 * | 7/2006 | Fukuda | G11C 7/1012<br>711/154 |
| 2022/0366216 | A1 * | 11/2022 | Tung | G06N 3/0464 |

* cited by examiner

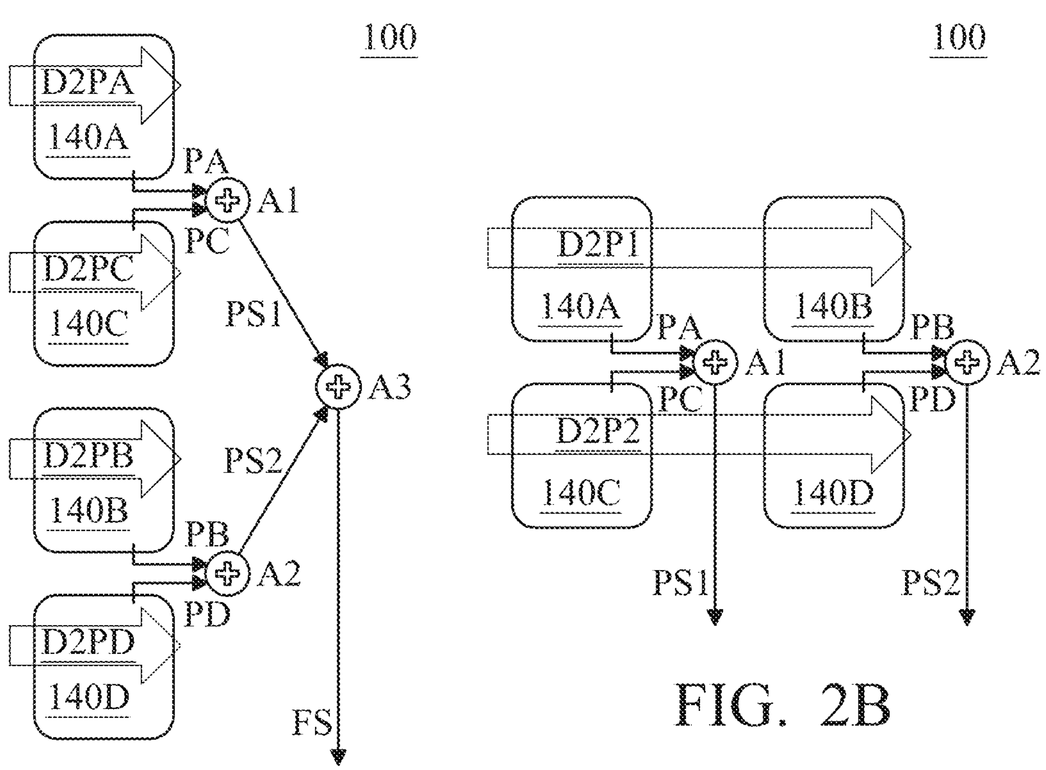
FIG. 2A
FIG. 2B
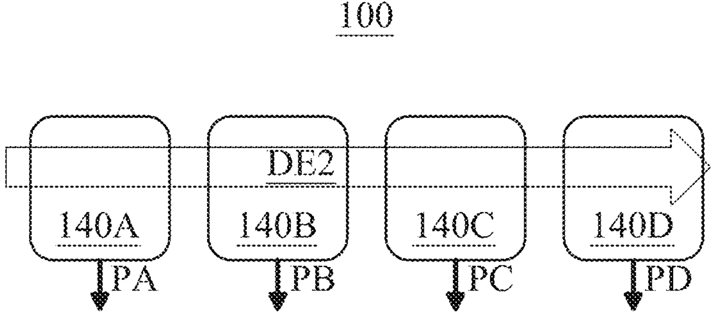
FIG. 2C

CONFIGURABLE COMPUTE-IN-MEMORY CIRCUIT AND METHOD

PRIORITY CLAIM

The present application claims the priority of U.S. Provisional Application No. 63/370,961, filed Aug. 10, 2022, which is incorporated herein by reference in its entirety.

BACKGROUND

Memory arrays are often used to store and access data used for various types of computations such as logic, partial sum calculations, or other mathematical operations. To perform these operations, data bits are moved between the memory arrays and circuits used to perform the computations. In some cases, e.g., neural network applications based on weights and input data, computations include multiple layers of operations, and the results of a first operation are used as input data in a second operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2G are schematic diagrams of data flow in a configurable CIM circuit, in accordance with some embodiments.

DETAILED DESCRIPTION

Figure 1:
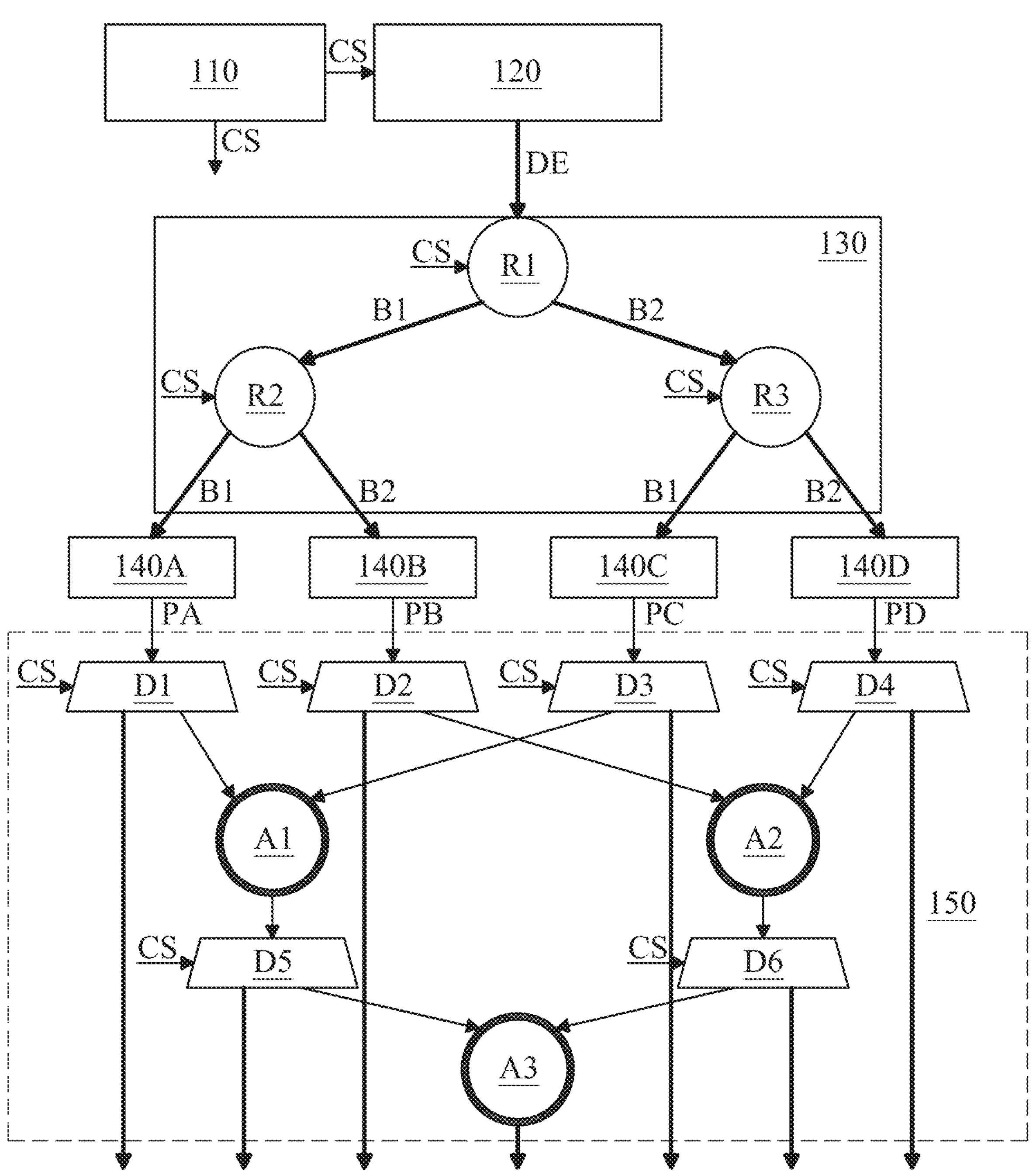
FIG. 1 is a schematic diagram of a configurable compute-in-memory (CIM) circuit, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a configurable compute-in-memory (CIM) circuit includes a data buffer coupled to a plurality of memory macros through a distribution network. The data buffer sequentially outputs first and second data elements, e.g., weight and input data elements, and the distribution network is configurable to output portions of the first data element to the memory macros and either portions or all of the second data element to the memory macros. Compared to approaches in which data elements are not distributed through a configurable network, the circuit enables improved CIM utilization including improved throughput and energy efficiency across various workloads.

Figure 2D:
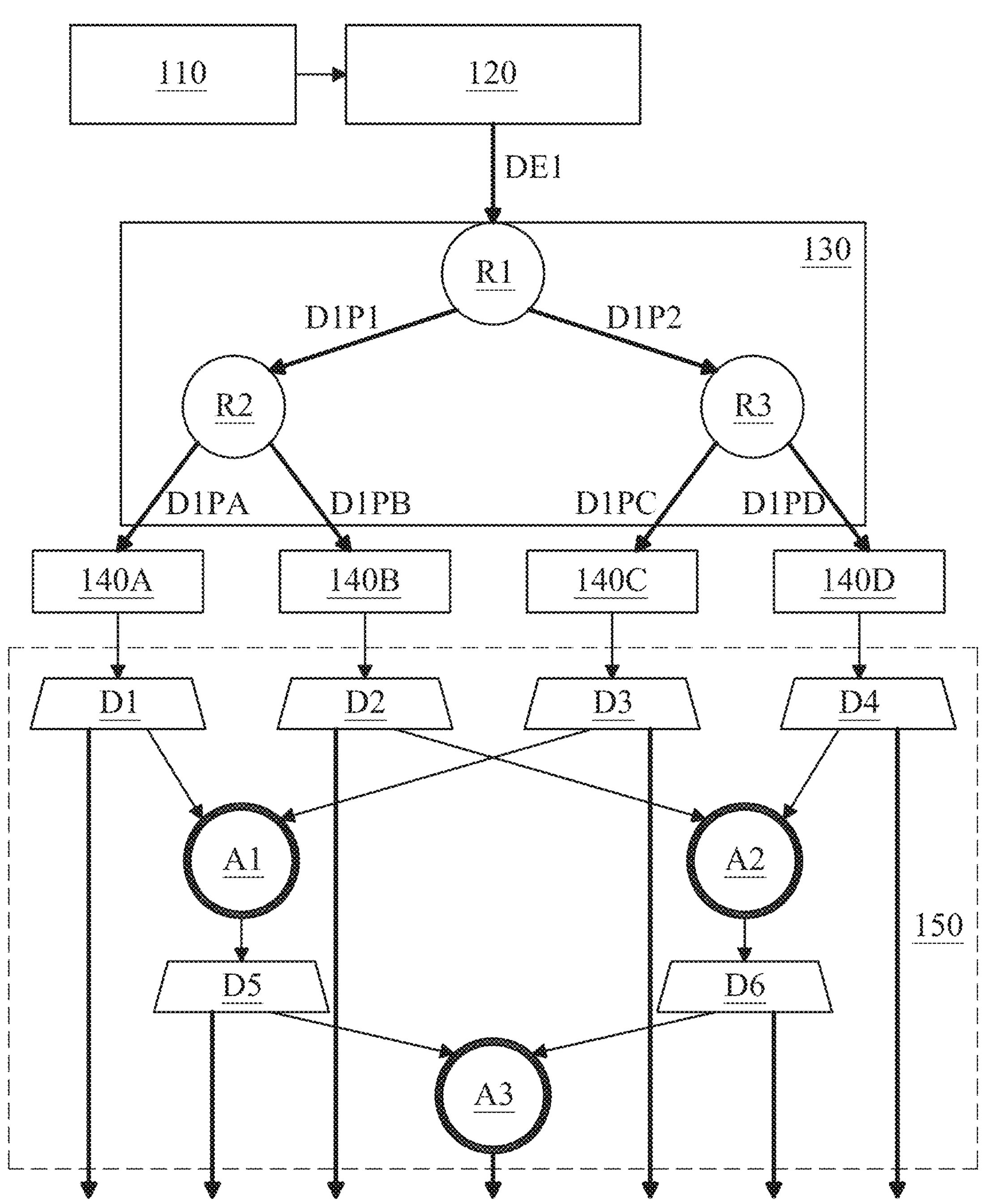
Figure 2E:
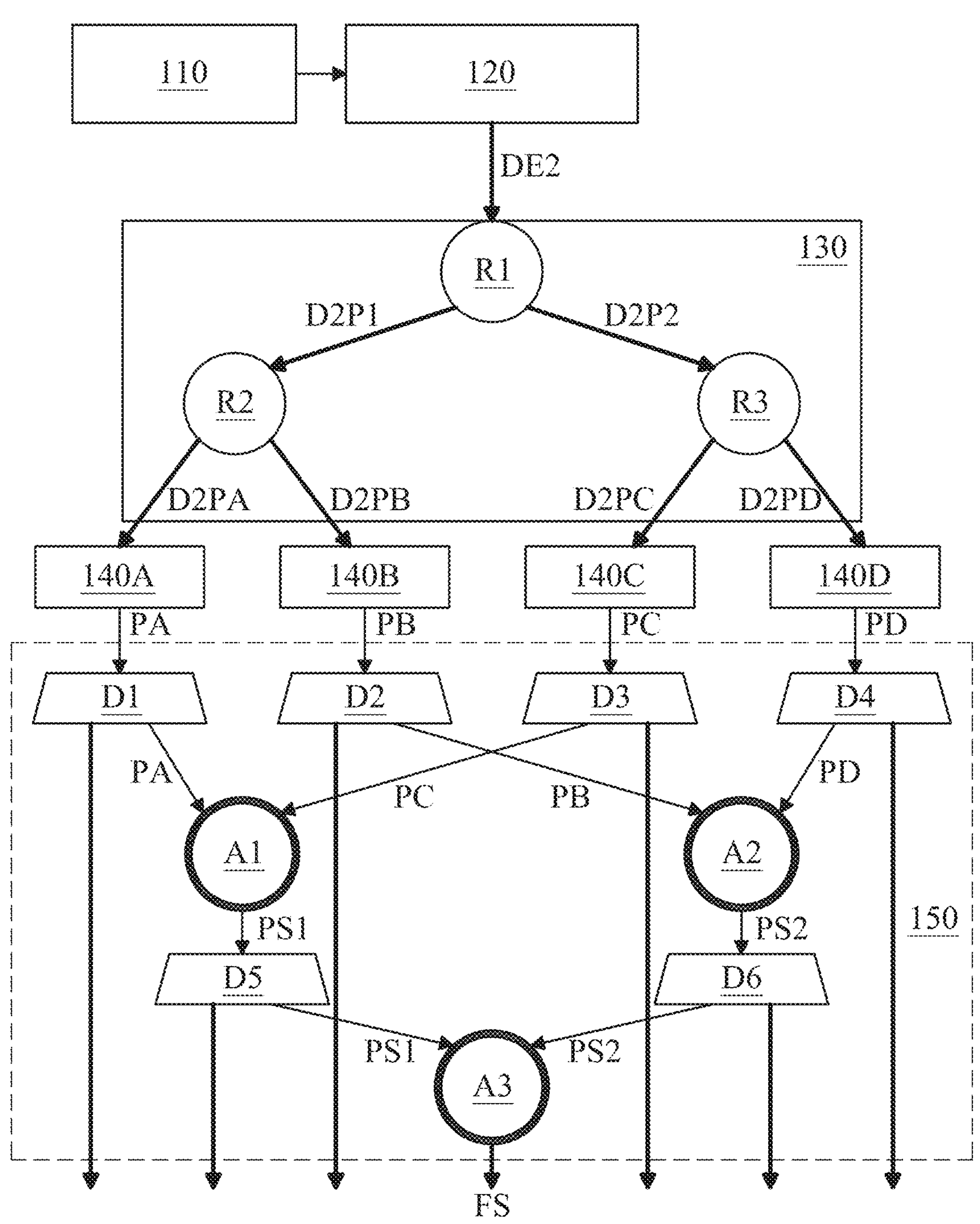
Figure 2F:
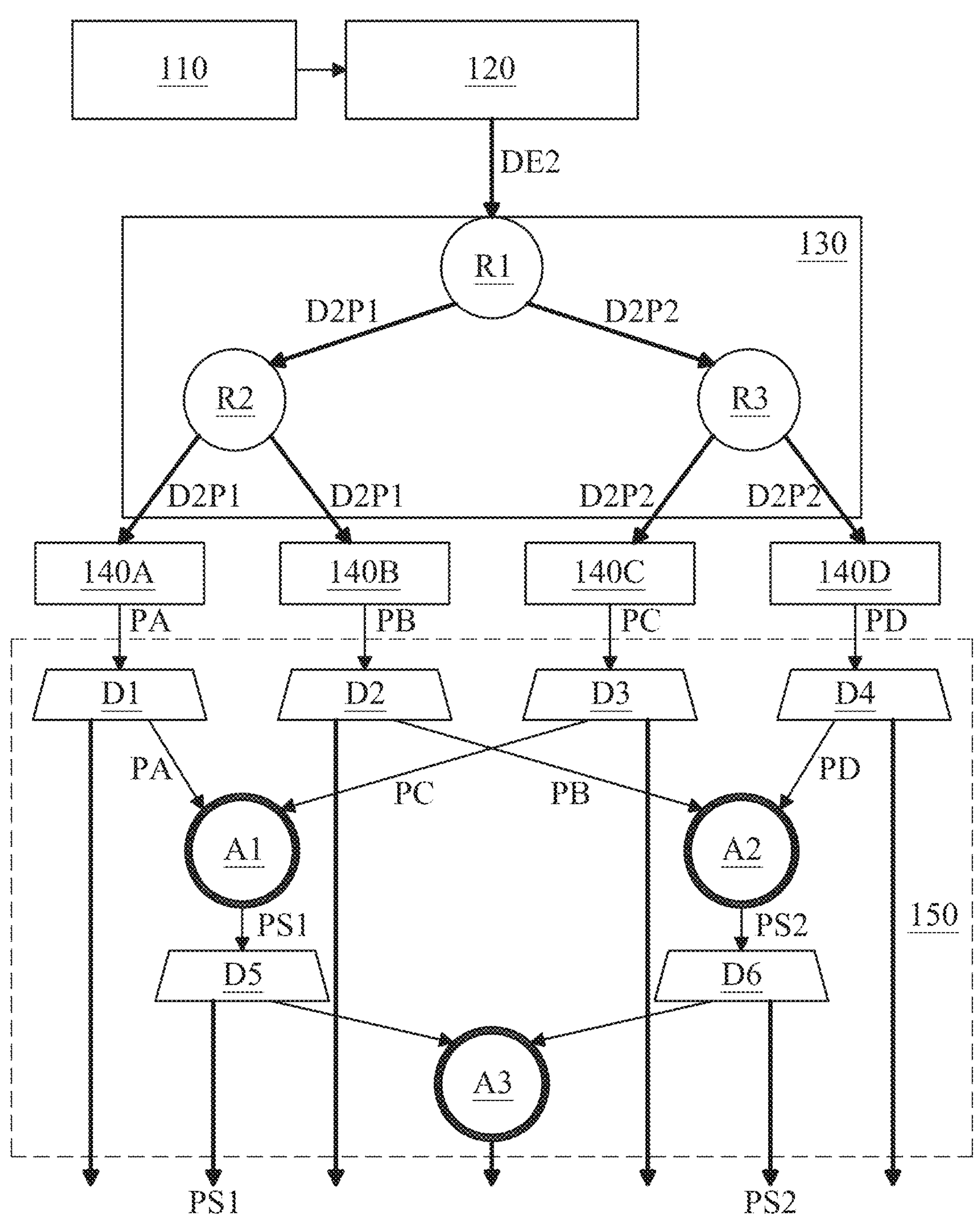
Figure 2G:
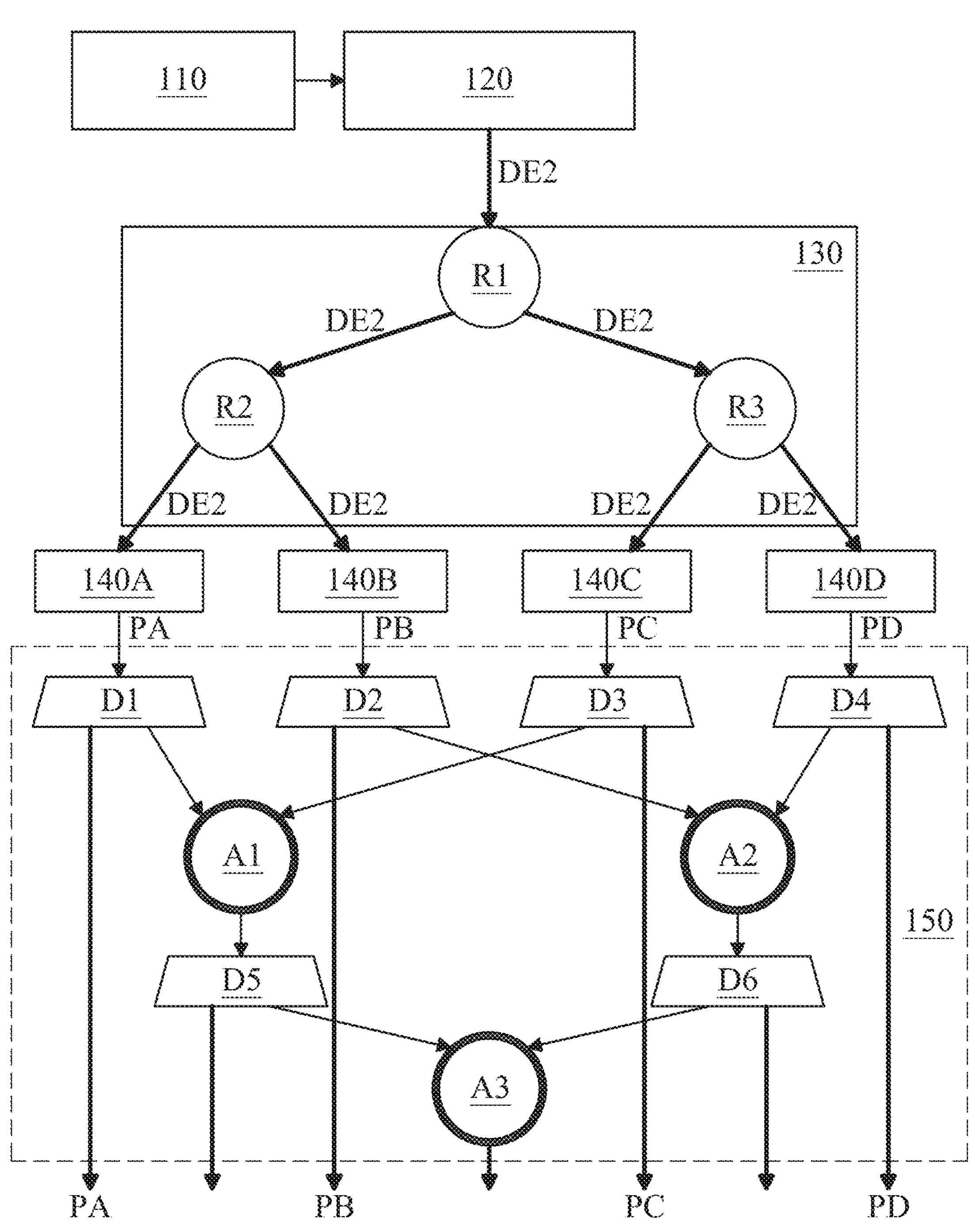

Each of FIGS. 1-2G is a schematic diagram of some or all of a configurable CIM circuit 100, in accordance with some embodiments. Configurable CIM circuit 100, also referred to as a circuit 100 or memory circuit 100 in some embodiments, includes a control circuit 110, a data buffer 120, a distribution circuit 130, memory macros 140A-140B, and an accumulation network 150.

Data buffer 120 is coupled to inputs (not labeled) of memory macros 140A-140B through distribution circuit 130, and outputs (not labeled) of memory macros 140A-140B are coupled to accumulation network 150.

Two or more circuit elements are considered to be coupled based on a direct electrical connection or an electrical connection that includes one or more additional circuit elements and is thereby capable of being controlled, e.g., made resistive or open by one or more transistors or other switching devices.

In some embodiments, circuit 100 is a portion of a neural network, e.g., a convolutional neural network (CNN), in which data elements include weight data elements that are applied in multiply and accumulate (MAC) operations to one or more sets of input data elements.

FIG. 1 depicts the overall configuration of circuit 100, and each of FIGS. 2A-2G depicts data flow within some or all of circuit 100, in operation, as discussed below.

Control circuit 110 is an electronic circuit, e.g., an integrated circuit (IC), including one or more logic devices configured to generate a plurality of control signals CS, and output control signals CS to each of data buffer 120, distribution network 130, and accumulation network 150 through one or more data busses (not shown). In some embodiments, control circuit 110 is configured to output control signals to memory macros 140A-140D and/or is combined with data buffer 120 as a signal circuit. In some embodiments, circuit 100 does not include control circuit 110 and is configured to receive control signals CS from an external circuit, e.g., a control circuit for a neural network including circuit 100.

Control circuit 110 is configured to generate control signals CS, and each of data buffer 120, distribution network 130, and accumulation network 150 is configured to respond to control signals CS so as to perform the various operations as discussed below with respect to circuit 100 and method 300.

Data buffer 120 is an electronic circuit including one or more storage devices configured as a unified buffer capable of storing and separately outputting first and second data elements represented collectively as data element DE in FIG. 1. In some embodiments, data buffer 120 includes one or more data registers (not shown) configured to receive and temporarily store data element DE, e.g., by including one or more latch or flip-flop circuits.

In some embodiments, one of first or second data element DE is a weight data element and the other of first or second data element DE is an input data element, also referred to as an activation data element in some embodiments.

A data element, e.g., data element DE, is a plurality of bits having a predefined total number of bits, e.g., corresponding to one or more matrix operations included in a neural network. In some embodiments, the predefined total number of bits corresponds to one or more computations of an artificial intelligence (AI) or other machine learning algorithm.

Data buffer 120 is configured to, in operation, store and sequentially output first and second data elements DE having varying total numbers of bits responsive to control signals CS. As the total number of bits of one or both of first or second data element DE increases, the capability and complexity of the associated computation increases as the computation time increases.

In some embodiments, data buffer 120 is configured to store and sequentially output first and second data elements DE having the total numbers of bits ranging from eight to 1024. In some embodiments, data buffer 120 is configured to store and sequentially output first and second data elements DE having the total numbers of bits ranging from 36 to 256.

Distribution network 130 is an electronic circuit including a plurality of switching devices responsive to control signals CS so as to, in operation, receive the sequentially output first and second data elements DE, and configurably output some or all of each of first or second data elements DE to each of memory macros 140A-140D in accordance with one of multiple predetermined data flows, as discussed below.

In the embodiment depicted in FIGS. 1 and 2D-2G, distribution network 130 includes three routing circuits R1-R3, each comprising two output branches B1 and B2. A routing circuit, e.g., routing circuits R1-R3, is an electronic circuit including a plurality of switching devices configured to receive a plurality of bits, e.g., some or all of data element DE, and, responsive to control signals CS, either output the plurality of bits to each of branches B1 and B2, or output a first portion, e.g., the first half, of the plurality of bits to branch B1 and a second portion, e.g., the second half, of the plurality of bits to branch B2.

In the embodiment depicted in FIGS. 1 and 2D-2G, routing circuit R1 is coupled to data buffer 120 and thereby configured to receive each of first and second data elements DE output from data buffer 120, and output either all or half of the first or second data element DE on branches B1 and B2. Each of routing circuits R2 and R3 is coupled to routing circuit R1 and thereby configured to receive the corresponding all or half of the first or second data element DE.

Routing circuit R2 includes branch B1 coupled to memory macro 140A and branch B2 coupled to memory macro 140B, and is thereby configured to output a corresponding all, half, or quarter of the first or second data element DE to each of memory macros 140A and 140B. Routing circuit R3 includes branch B1 coupled to memory macro 140C and branch B2 coupled to memory macro 140D, and is thereby configured to output a corresponding all, half, or quarter of the first or second data element DE to each of memory macros 140C and 140D.

In the embodiment depicted in FIGS. 1 and 2D-2G, distribution circuit 130 is thereby configured to distribute some or all of each of first or second data elements DE to a total of four memory macros 140A-140D. In some embodiments, distribution circuit 130 includes a single routing circuit, e.g., routing circuit R1, and is thereby configured to distribute some or all of each of first or second data elements DE to a total of two memory macros. In some embodiments, distribution circuit 130 includes one or more routing circuits (not shown) in addition to routing circuits R1-R3 and is thereby configured to distribute some or all of each of first or second data elements DE to one or more memory macros (not shown) in addition to memory macros 140A-140D, e.g., by including a total of seven routing circuits configured to distribute some or all of each of first or second data elements DE to a total of eight memory macros.

A memory macro, e.g., memory macro 140A-140D, is an electronic circuit including a memory array, e.g., a static random access memory (SRAM) array, and one or more computation circuits configured to perform one or more multiplication operations and output the resultant product. In some embodiments, a memory macro includes a CIM macro configured to output the corresponding product by performing the one or more multiplication operations as part of a matrix or vector computation.

Each memory macro 140A-140D includes the memory array having a capacity sufficient to store, and perform the one or more multiplication operations on, at least a quarter of the first data element DE and all of the second data element DE.

In the embodiment depicted in FIGS. 1-2G, circuit 100 includes a total of four memory macros 140A-140D. In some embodiments, circuit 100 includes a total of fewer or greater than four memory macros.

Each of memory macros 140A-140D is coupled to accumulation network 150 and is thereby configured to output a respective product PA-PD to accumulation network 150.

Accumulation network 150 is an electronic circuit including a plurality of switching devices and one or more adder circuits configured to, in operation, receive products PA-PD and output products PA-PD individually or in combination in accordance with the predetermined data flow, as discussed below.

In the embodiment depicted in FIGS. 1 and 2D-2G, accumulation network 150 includes a first layer of demultiplexers D1-D4 coupled to memory macros 140A-140D, respectively, a first layer of adders A1 and A2 coupled to demultiplexers D1-D4, a second layer of demultiplexers D5 and D6 coupled to adders A1 and A2, and a second layer of adders including a single adder A3 coupled to demultiplexers D5 and D6.

A demultiplexer, e.g., demultiplexer D1-D6, is an electronic circuit including a plurality of switching devices configured to, in operation, receive a data element, e.g., product PA-PD, and selectively output the data element responsive to control signals CS.

An adder, e.g., adder A1-A3, is an electronic circuit including one or more logic gates configured to perform a mathematical operation, e.g., addition, based on received first and second data elements, thereby generating a sum data element equal to the sum of the received first and second data elements. In various embodiments, an adder includes one or more full adder gates, half adder gates, ripple-carry adder circuits, carry-save adder circuits, carry-select adder circuits, carry-look-ahead adder circuits, or other circuits suitable for performing some or all of an addition operation.

Demultiplexer D1 is configured to receive and selectively output product PA either to adder A1 or from circuit 100. Demultiplexer D2 is configured to receive and selectively output product PB either to adder A2 or from circuit 100. Demultiplexer D3 is configured to receive and selectively output product PC either to adder A1 or from circuit 100. Demultiplexer D4 is configured to receive and selectively output product PD either to adder A2 or from circuit 100.

Adder A1 is configured to receive product PA from demultiplexer D1 and product PC from demultiplexer D3, and output a first sum data element (not labeled in FIG. 1) to demultiplexer D5. Adder A2 is configured to receive product PB from demultiplexer D2 and product PD from demultiplexer D4, and output a second sum data element (not labeled in FIG. 1) to demultiplexer D6.

Demultiplexer D5 is configured to receive and selectively output the first sum data element either to adder A3 or from circuit 100. Demultiplexer D6 is configured to receive and selectively output the second sum data element either to adder A3 or from circuit 100.

Adder A3 is configured to receive the first and second sum data elements and output a third sum data element (not labeled in FIG. 1) from circuit 100.

In the embodiment depicted in FIGS. 1-2G, accumulation network 150 is thereby configured to output individual and combinations of data products received from a total of four memory macros 140A-140D. In some embodiments, accumulation network 150 is configured to output individual and combinations of data products received from a total of fewer than four memory macros, e.g., by including a single layer of demultiplexers D1-D6 and a single layer of adders A1-A3. In some embodiments, accumulation network 150 is configured to output individual and combinations of data products received from a total of greater than four memory macros, e.g., by including one or more layers of demultiplexers (not shown) in addition to demultiplexers D1-D6 and one or more layers of adders (not shown) in addition to adders A1-A3.

In some embodiments, circuit 100 does not include accumulation network 150, and memory macros 140A-140D are configured to directly output respective products PA-PD from circuit 100.

FIGS. 2A-2G depict non-limiting examples of predetermined data flows with respect to circuit 100. FIGS. 2A-2C depict simplified schematic diagrams, FIG. 2D depicts data flow with respect to first data element DE1, and each of FIGS. 2E-2G depicts data flow with respect to second data element DE2.

Each predetermined data flow corresponds to data buffer 120 outputting first data element DE1 followed by second data element DE2. In some embodiments, first data element DE1 is a weight data element, second data element DE2 is an input data element, and the predetermined data flows correspond to weight stationary (WS) data flows. In some embodiments, first data element DE1 is an input data element, second data element DE2 is a weight data element, and the predetermined data flows correspond to input stationary (IS) data flows.

In the embodiments depicted in FIGS. 2A-2C, memory macros 140A-140D receive portions or all of second data element DE2 from distribution circuit 130 (not shown) in accordance with respective 4×1, 2×2, and 1×4 floorplans. Each of the floorplans depicted in FIGS. 2A-2C corresponds to each of memory macros 140A-140D having received a corresponding quarter of first data element DE1 (not shown) prior to the data flow depicted with respect to second data element DE2.

In the 4×1 floorplan depicted in FIG. 2A, memory macros 140A-140D receive respective second data element portions D2PA-D2PD, each of which represents a quarter of second data element DE2. Adder Al receives products PA and PC and generates partial sum PS1. Adder A2 receives products PB and PD and generates partial sum PS2. Adder A3 receives partial sums PS1 and PS2 and generates full sum FS. Circuit 100 is thereby configured in the 4×1 floorplan to multiply each quarter of first data element DE1 with a corresponding quarter of second data element DE2, and output the cumulative sum as full sum FS.

In the 2×2 floorplan depicted in FIG. 2B, each of memory macros 140A and 140B receives second data element portion D2P1 and each of memory macros 140C and 140D receives second data element portion D2P2. Adder A1 receives products PA and PC and generates and outputs partial sum PS1. Adder A2 receives products PB and PD and generates and outputs partial sum PS2. Adder A3 is not used. Circuit 100 is thereby configured in the 2x2 floorplan to multiply each quarter of first data element DE1 with a corresponding half of second data element DE2, and output partial sums PS1 and PS2 as a collective full sum.

In the 1x4 floorplan depicted in FIG. 2C, each of memory macros 140A-140D receives all of second data element DE2. Adders A1-A3 are not used, and circuit 100 is thereby configured in the 1×4 floorplan to multiply each quarter of first data element DE1 with all of second data element DE2, and output products PA-PD as a collective full sum.

FIG. 2D depicts the distribution of first data element DE1 in accordance with each of the floorplans. As depicted in FIG. 2D, routing circuit R1 receives first data element DE1 from data buffer 120, and outputs a first portion D1P1 corresponding to a first half of first data element DE1 to routing circuit R2 and a second portion D1P2 corresponding to a second half of first data element DE1 to routing circuit R3.

Routing circuit R2 receives first portion D1P1 from routing circuit R1, and outputs a first portion D1PA corresponding to a first half of first portion D1P1 to memory macro 140A and a second portion D1PB corresponding to a second half of first portion D1P1 to memory macro 140B.

Routing circuit R3 receives second portion D1P2 from routing circuit R1, and outputs a first portion D1PC corresponding to a first half of second portion D1P2 to memory macro 140C and a second portion D1PD corresponding to a second half of second portion D1P2 to memory macro 140D.

Circuit 100 including configurable distribution network 130 is thereby configured to distribute quarters D1PA-D1PD of first data element DE1 to corresponding ones of memory macros 140A-140D in accordance with each of the floorplans.

FIG. 2E depicts the distribution of second data element DE2 and subsequent accumulation in accordance with the 4×1 floorplan. In the embodiment depicted in FIG. 2E, second data element DE2 is distributed in the same manner as first data element DE1 such that routing circuit R1 outputs portion D2P1 to routing circuit R2 and portion D2P2 to routing circuit R3, routing circuit R2 outputs portion D2PA to memory macro 140A and portion D2PB to memory macro 140B, and routing circuit R3 outputs portion D2PC to memory macro 140C and portion D2PD to memory macro 140D.

Demultiplexers D1 and D3 output respective products PA and PC to adder A1, and demultiplexers D2 and D4 output respective products PB and PD to adder A2. Adders A1 and A2 output respective partial sums PS1 and PS2 to demultiplexers D5 and D6, which output corresponding partial sums PS1 and PS2 to adder A3. Adder A3 generates and outputs full sum FS from circuit 100.

Circuit 100 including configurable distribution network 130 and configurable accumulation network 150 is thereby configured to distribute quarters D2PA-D2PD of second data element DE2 to corresponding ones of memory macros 140A-140D, and perform the subsequent accumulation operations in accordance with the 4×1 floorplan.

FIG. 2F depicts the distribution of second data element DE2 and subsequent accumulation in accordance with the 2×2 floorplan. In the embodiment depicted in FIG. 2F, second data element DE2 is distributed such that routing circuit R1 outputs portion D2P1 to routing circuit R2 and portion D2P2 to routing circuit R3, routing circuit R2 outputs portion D2P1 to each of memory macros 140A and 140B, and routing circuit R3 outputs portion D2P2 to each of memory macros 140C and 140D.

Demultiplexers D1 and D3 output respective products PA and PC to adder A1, and demultiplexers D2 and D4 output respective products PB and PD to adder A2. Adders A1 and A2 output respective partial sums PS1 and PS2 to demultiplexers D5 and D6, which output corresponding partial sums PS1 and PS2 from circuit 100.

Circuit 100 including configurable distribution network 130 and configurable accumulation network 150 is thereby configured to distribute halves D2P1 and D2P2 of second data element DE2 to corresponding ones of memory macros 140A-140D, and perform the subsequent accumulation operations in accordance with the 2×2 floorplan.

FIG. 2G depicts the distribution of second data element DE2 and subsequent accumulation in accordance with the 1×4 floorplan. In the embodiment depicted in FIG. 2G, second data element DE2 is distributed such that routing circuit R1 outputs second data element DE2 to each of routing circuits R2 and R3, routing circuit R2 outputs second data element DE2 to each of memory macros 140A and 140B, and routing circuit R3 outputs second data element DE2 to each of memory macros 140C and 140D.

Demultiplexers D1-D4 output respective products PA-PD from circuit 100.

Circuit 100 including configurable distribution network 130 and configurable accumulation network 150 is thereby configured to distribute second data element DE2 to each of memory macros 140A-140D, and perform the subsequent outputting operations in accordance with the 1×4 floorplan.

Figure 3:
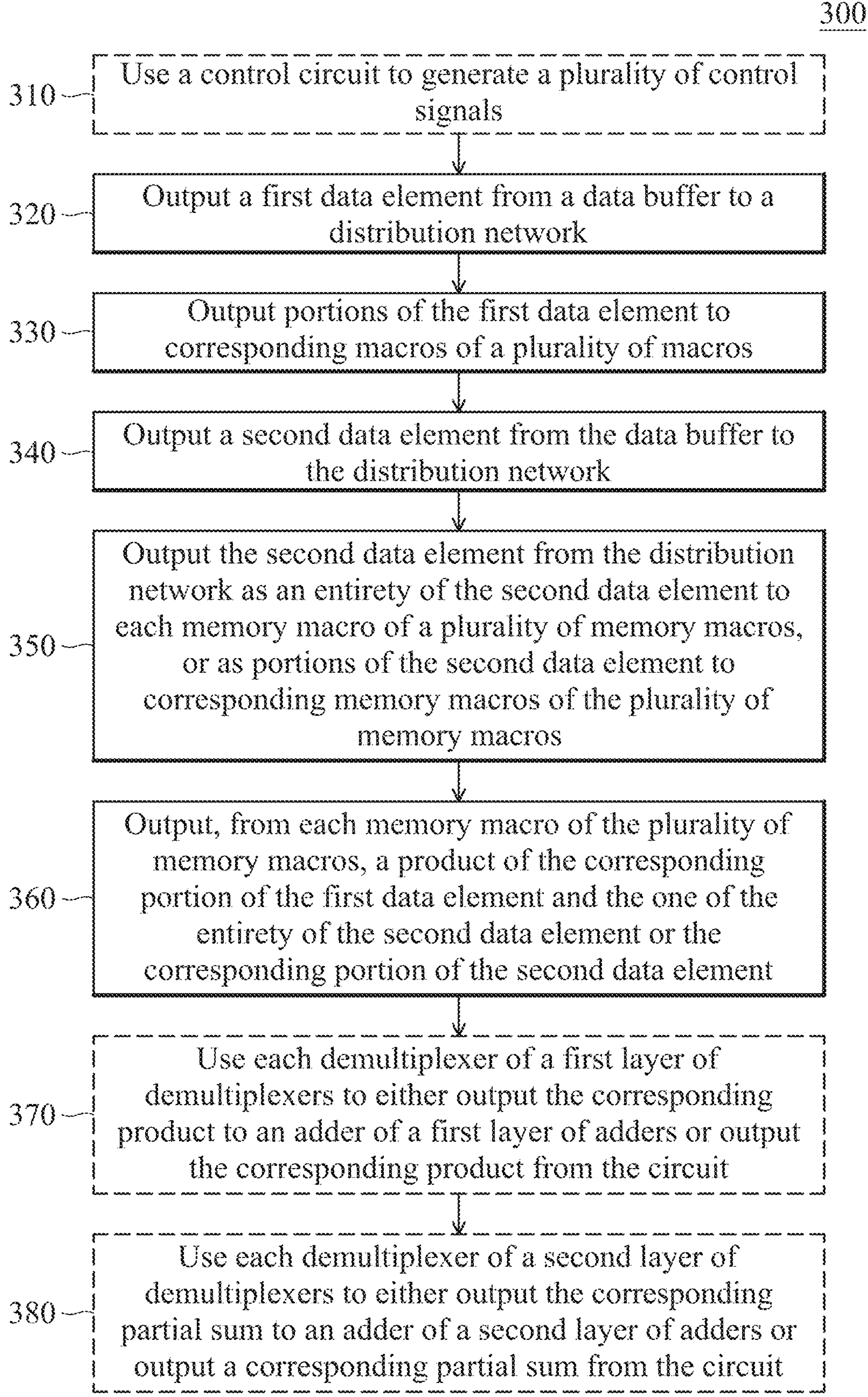
FIG. 3 is a flowchart of a method of operating a configurable CIM circuit, in accordance with some embodiments.

By the configuration discussed above, circuit 100 includes data buffer 120 coupled to memory macros 140A-140D through distribution network 130. Data buffer 120 is configured to sequentially output first and second data elements DE, distribution network 130 is configurable to output portions of first data element DE1 to memory macros 140A-140D and either portions or all of second data element DE2 to memory macros 140A-140D. Compared to approaches in which data elements are not distributed through a configurable network, circuit 100 enables improved CIM utilization including improved throughput and energy efficiency across various workloads FIG. 3 is a flowchart of method 300 of operating a circuit, in accordance with some embodiments. Method 300 is usable with a configurable CIM circuit, e.g., circuit 100 discussed above with respect to FIGS. 1-2G.

The sequence in which the operations of method 300 are depicted in FIG. 3 is for illustration only; the operations of method 300 are capable of being executed in sequences that differ from that depicted in FIG. 3. In some embodiments, operations in addition to those depicted in FIG. 3 are performed before, between, during, and/or after the operations depicted in FIG. 3. In some embodiments, the operations of method 300 are a subset of a method of operating a neural network, e.g., a CNN.

At operation 310, in some embodiments, a control circuit is used to generate a plurality of control signals. In some embodiments, using the control circuit to generate the plurality of control signals includes using control circuit 110 to generate control signals CS as discussed above with respect to FIG. 1.

At operation 320, a first data element is output from a data buffer to a distribution network. In some embodiments, outputting the first data element from the data buffer to the distribution network includes outputting first data element DE1 from data buffer 120 to distribution network 130, as discussed above with respect to FIGS. 1 and 2D.

At operation 330, portions of the first data element are output from the distribution network to corresponding macros of a plurality of macros. In some embodiments, outputting the portions of the first data element from the distribution network to corresponding macros of a plurality of macros includes outputting portions of first data element DE1 from distribution network 130 to corresponding macros 140A-140D, as discussed above with respect to FIGS. 1 and 2D.

At operation 340, a second data element is output from the data buffer to the distribution network. In some embodiments, outputting the second data element from the data buffer to the distribution network includes outputting second data element DE2 from data buffer 120 to distribution network 130, as discussed above with respect to FIGS. 1 and 2E-2G.

At operation 350, the second data element is output from the distribution network as an entirety of the second data element to each memory macro of a plurality of memory macros, or as portions of the second data element to corresponding memory macros of the plurality of memory macros. In some embodiments, outputting the second data element from the distribution network as an entirety of the second data element to each macro of a plurality of macros, or as portions of the second data element to corresponding macros of the plurality of macros includes outputting second data element DE2 from distribution network 130 as second data element DE2 to each of memory macros 140A-140D, or as portions D2P1 and D2P2 or D2PA-D2PD to corresponding memory macros 140A-140D, as discussed above with respect to FIGS. 1 and 2E-2G.

At operation 360, a product of the corresponding portion of the first data element and the one of the entirety of the second data element or the corresponding portion of the second data element is output from each memory macro of the plurality of memory macros. In some embodiments, outputting the product of the corresponding portion of the first data element and the one of the entirety of the second data element or the corresponding portion of the second data element from each memory macro of the plurality of memory macros includes outputting products PA-PD from respective memory macros 140A-140D, as discussed above with respect to FIGS. 1-2G.

At operation 370, in some embodiments, each demultiplexer of a first layer of demultiplexers is used to either output the corresponding product to an adder of a first layer of adders or output the corresponding product from the circuit. In some embodiments, using each demultiplexer of the first layer of demultiplexers to either output the corresponding product to the adder of the first layer of adders or output the corresponding product from the circuit includes using demultiplexers D1-D4 to output respective products PA-PD either to adders A1 and A2 or from circuit 100, as discussed above with respect to FIGS. 1-2G.

At operation 380, in some embodiments, each demultiplexer of a second layer of demultiplexers is used to either output the corresponding partial sum to an adder of a second layer of adders or output a corresponding partial sum from the circuit. In some embodiments, each using demultiplexer of the second layer of demultiplexers to either output the corresponding partial sum to the adder of the second layer of adders or output the corresponding partial sum from the circuit includes using demultiplexers D5 and D6 to output respective partial sums PS1 and PS2 either to adder A3 or from circuit 100, as discussed above with respect to FIGS. 1-2G.

In some embodiments, operation 380 includes using layers in addition to the first and second layers to perform additional accumulation operations as discussed above with respect to FIG. 1.

By executing some or all of the operations of method 300, a circuit is configured to distribute first and second data elements to a plurality of memory macros, and perform subsequent multiplication operations, thereby achieving the benefits discussed above with respect to configurable CIM circuit 100.

In some embodiments, a circuit includes a data buffer configured to sequentially output first and second pluralities of bits, a plurality of memory macros having a total number of memory macros, and a distribution network coupled between the data buffer and the plurality of memory macros. The distribution network is configured to separate the first plurality of bits into the total number of first subsets, and output each first subset to a corresponding memory macro of the plurality of memory macros, and one of output an entirety of the second plurality of bits to each memory macro of the plurality of memory macros, or separate the second plurality of bits into a number of second subsets less than or equal to the total number, and output each second subset to one or more corresponding memory macros of the plurality of memory macros, and each memory macro of the plurality of memory macros is configured to output a product of the corresponding first subset and the one of the entirety of the second plurality of bits or the corresponding second subset of the second plurality of bits.

In some embodiments, a circuit includes a data buffer configured to sequentially output first and second data elements, first through fourth memory macros, and first through third routing circuits coupled between the data buffer and the first through fourth memory macros. The first routing circuit is configured to output first and second halves of the first data element to the respective second and third routing circuits, and output either the second data element to each of the second and third routing circuits, or first and second halves of the second data element to the respective second and third routing circuits. The second routing circuit is configured to output first and second quarters of the first data element to the respective first and second memory macros, and output either the second data element or the first half of the second data element to each of the first and second memory macros, or first and second quarters of the second data element to the respective first and second memory macros. The third routing circuit is configured to output third and fourth quarters of the first data element to the respective third and fourth memory macros, and output either the second data element or the second half of the second data element to each of the third and fourth memory macros, or third and fourth quarters of the second data element to the respective third and fourth memory macros. Each of the first through fourth memory macros is configured to output a product of the corresponding quarter of the first data element and the corresponding second data element, second data element half, or second data element quarter.

In some embodiments, a method of operating a circuit includes outputting a first data element from a data buffer to a distribution network, the first data element being one of a weight data element or an input data element, outputting portions of the first data element from the distribution network to corresponding macros of a plurality of macros, outputting a second data element from the data buffer to the distribution network, the second data element being the other of the weight data element or the input data element, outputting the second data element from the distribution network as one of an entirety of the second data element to each macro of a plurality of macros, or portions of the second data element to corresponding macros of the plurality of macros, and outputting, from each memory macro of the plurality of memory macros, a product of the corresponding portion of the first data element and the one of the entirety of the second data element or the corresponding portion of the second data element.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit comprising:

a data buffer configured to sequentially output first and second pluralities of bits;

a plurality of memory macros having a total number of memory macros; and a distribution network coupled between the data buffer and the plurality of memory macros, wherein the distribution network is configured to:

separate the first plurality of bits into the total number of first subsets, and output each first subset to a corresponding memory macro of the plurality of memory macros, and one of:

output an entirety of the second plurality of bits to each memory macro of the plurality of memory macros, or separate the second plurality of bits into a number of second subsets less than or equal to the total number, and output each second subset to one or more corresponding memory macros of the plurality of memory macros, and each memory macro of the plurality of memory macros is configured to output a product of the corresponding first subset and the one of the entirety of the second plurality of bits or the corresponding second subset of the second plurality of bits.

2. The circuit of claim 1, wherein the first plurality of bits comprises a weight data element and the second plurality of bits comprises an input data element, or the first plurality of bits comprises an input data element and the second plurality of bits comprises a weight data element.

3. The circuit of claim 1, further comprising:
a first layer of demultiplexers coupled to the plurality of memory macros, and
a first layer of adders coupled to the first layer of demultiplexers,
wherein each demultiplexer of the first layer of demultiplexers is configured to:
receive a product output by a corresponding memory macro of the plurality of memory macros,
output the product to an adder of the first layer of adders when the product is based on the second subset of the second plurality of bits, and
output the product from the circuit when the product is based on the entirety of the second plurality of bits.

4. The circuit of claim 3, further comprising:
a second layer of demultiplexers coupled to the first layer of adders, and
a second layer of adders coupled to the second layer of demultiplexers,
wherein each demultiplexer of the second layer of demultiplexers is configured to:
receive a partial sum output by a corresponding adder of the first layer of adders,
output the partial sum to an adder of the second layer of adders when the partial sum corresponds to the number of second subsets equal to the total number, and
output the partial sum from the circuit when the partial sum corresponds to the number of second subsets less than the total number.

5. The circuit of claim 3, further comprising a control circuit configured to generate one or more control signals, wherein
the distribution network is configured to perform the corresponding separating and outputting operations responsive to the one or more control signals, and
each demultiplexer of the first layer of demultiplexers is configured to perform the corresponding outputting operations responsive to the one or more control signals.

6. The circuit of claim 1, wherein
the distribution network comprises a plurality of routing circuits, and
each routing circuit comprises two output branches and is configured to:
receive a data element from the data buffer or from another routing circuit, and
output either a half or an entirety of the received data element to each output branch.

7. The circuit of claim 1, wherein
each memory macro of the plurality of memory macros comprises a compute-in-memory (CIM) macro configured to output the corresponding product by performing a multiplication operation of a matrix computation.

8. A circuit comprising:
a data buffer configured to sequentially output first and second data elements;
first through fourth memory macros; and
first through third routing circuits coupled between the data buffer and the first through fourth memory macros, wherein
the first routing circuit is configured to:
output first and second halves of the first data element to the respective second and third routing circuits, and
output either the second data element to each of the second and third routing circuits, or first and second halves of the second data element to the respective second and third routing circuits,
the second routing circuit is configured to:
output first and second quarters of the first data element to the respective first and second memory macros, and
output either the second data element or the first half of the second data element to each of the first and second memory macros, or first and second quarters of the second data element to the respective first and second memory macros,
the third routing circuit is configured to:
output third and fourth quarters of the first data element to the respective third and fourth memory macros, and
output either the second data element or the second half of the second data element to each of the third and fourth memory macros, or third and fourth quarters of the second data element to the respective third and fourth memory macros, and
each of the first through fourth memory macros is configured to output a product of the corresponding quarter of the first data element and the corresponding second data element, second data element half, or second data element quarter.

9. The circuit of claim 8, wherein the first and second data elements comprise either respective weight and input data elements or respective input and weight data elements.

10. The circuit of claim 8, further comprising:
a control circuit configured to generate a plurality of control signals,
wherein each of the first through third routing circuits is configured to output each of the corresponding first data element half, first data element quarter, second data element, second data element half, and second data element quarter responsive to the plurality of control signals.

11. The circuit of claim 10, further comprising:
first through fourth demultiplexers coupled to the first through fourth memory macros, respectively,
a first adder coupled to each of the first and third demultiplexers, and
a second adder coupled to each of the second and fourth demultiplexers,
wherein each of the first through fourth demultiplexers is configured to, responsive to the plurality of control signals:
receive a corresponding product,
output the product to the corresponding first or second adder when the product is based on the second data element half or the second data element quarter, and
output the product from the circuit when the product is based on the second data element.

12. The circuit of claim 11, further comprising:
fifth and sixth demultiplexers coupled to the first and second adders, respectively, and
a third adder coupled to each of the fifth and sixth demultiplexers,
wherein each of the fifth and sixth demultiplexers is configured to, responsive to the plurality of control signals:

receive a partial sum output by a corresponding one of the first or second adder, output the partial sum to the third adder when the partial sum corresponds to the second data element quarter, and output the partial sum from the circuit when the partial sum corresponds to the second data element half.

13. The circuit of claim 8, wherein each of the first through fourth memory macros comprises a compute-in-memory (CIM) macro configured to output the corresponding product by performing a multiplication operation of a matrix computation.

14. The circuit of claim 8, wherein a total number of bits of the fist data element is greater than a total number of bits of the second data element.

15. A method of operating a circuit, the method comprising:

outputting a first data element from a data buffer to a distribution network, the first data element being one of a weight data element or an input data element;

outputting portions of the first data element from the distribution network to corresponding memory macros of a plurality of memory macros;

outputting a second data element from the data buffer to the distribution network, the second data element being the other of the weight data element or the input data element;

outputting the second data element from the distribution network as one of:

an entirety of the second data element to each memory macro of the plurality of memory macros, or portions of the second data element to corresponding memory macros of the plurality of memory macros; and outputting, from each memory macro of the plurality of memory macros, a product of the corresponding portion of the first data element and the one of the entirety of the second data element or the corresponding portion of the second data element.

16. The method of claim 15, further comprising using a control circuit to generate a plurality of control signals, wherein the outputting the first data element from the data buffer being the one of the weight data element or the input data element and the outputting the second data element from the data buffer being the other of the weight data element or the input data element is in response to the plurality of control signals.

17. The method of claim 16, wherein the outputting each of the first and second data elements from the distribution network to the plurality of memory macros comprises using each routing circuit of a plurality of routing circuits to distribute some or all of the corresponding first or second data element in response to the plurality of control signals.

18. The method of claim 16, further comprising:

receiving each product from the plurality of memory macros at a corresponding demultiplexer of a first layer of demultiplexers, and in response to some or all of the control signals, using each demultiplexer of the first layer of demultiplexers to either output the corresponding product to an adder of a first layer of adders or output the corresponding product from the circuit.

19. The method of claim 18, further comprising:

receiving patrial sums from each adder of the first layer of adders at a corresponding demultiplexer of a second layer of demultiplexers, and in response to the control signals, using each demultiplexer of the second layer of demultiplexers to either output a corresponding partial sum to an adder of a second layer of adders or output the corresponding partial sum from the circuit.

20. The method of claim 16, wherein the outputting the product from each memory macro of the plurality of memory macros comprises using a compute-in-memory (CIM) macro to perform a multiplication operation of a matrix computation.

* * * * *